United States Patent [19]

Noda et al.

[11] Patent Number: 5,077,749
[45] Date of Patent: Dec. 31, 1991

[54] LASER APPARATUS

[75] Inventors: Etsuo Noda, Fujisawa; Osami Morimiya, Tokyo; Setsuo Suzuki, Yokohama; Shintaro Hata, Yokosuka, all of Japan

[73] Assignee: Kabushiki Kaisha Toshiba, Kanagawa, Japan

[21] Appl. No.: 489,059

[22] Filed: Mar. 7, 1990

[30] Foreign Application Priority Data

Jul. 10, 1989 [JP] Japan .................. 1-177326
Jul. 10, 1989 [JP] Japan .................. 1-177327

[51] Int. Cl.⁵ ........................................ H01S 3/038
[52] U.S. Cl. ................................ 372/65; 372/87; 372/107; 372/33; 372/56; 313/146
[58] Field of Search ............... 372/61, 65, 33, 83, 372/87, 56, 86, 107; 445/28, 29; 313/146

[56] References Cited

U.S. PATENT DOCUMENTS

| | | | |
|---|---|---|---|
| 3,970,883 | 7/1976 | Lavering | 313/146 |
| 4,194,120 | 3/1980 | Meier et al. | 313/146 |
| 4,354,717 | 10/1982 | Rech et al. | 445/28 |
| 4,375,688 | 3/1983 | Taguchi | 372/65 |
| 4,503,542 | 3/1985 | Cirkel et al. | 372/87 |
| 4,547,886 | 10/1985 | Kaminski et al. | 372/87 |
| 4,554,667 | 11/1985 | Kaminski | 372/87 |
| 4,617,668 | 10/1986 | Rudko et al. | 372/87 |
| 4,651,324 | 3/1987 | Prein et al. | 372/61 |
| 4,694,463 | 9/1987 | Hirth et al. | 372/61 |
| 4,718,072 | 1/1988 | Marchetti et al. | 372/86 |
| 4,730,333 | 3/1988 | Butenuth | 372/87 |
| 4,774,714 | 9/1988 | Javan | 372/87 |
| 4,794,612 | 12/1988 | Fuke | 372/56 |
| 4,800,567 | 1/1989 | Karube | 372/87 |
| 4,807,236 | 2/1989 | Martinen et al. | 372/87 |
| 4,945,545 | 7/1990 | Piper | 372/56 |
| 4,947,403 | 8/1990 | Ishihara | 372/65 |
| 4,953,174 | 8/1990 | Eldridge et al. | 372/86 |

FOREIGN PATENT DOCUMENTS

| | | |
|---|---|---|
| 1269892 | 4/1972 | United Kingdom . |
| 2177846 | 1/1987 | United Kingdom . |
| 2208751 | 4/1989 | United Kingdom . |

Primary Examiner—William L. Sikes
Assistant Examiner—Susan S. Morse
Attorney, Agent, or Firm—Foley & Lardner

[57] ABSTRACT

Disclosed is a laser apparatus for effecting laser oscillation by exciting a laser medium by discharge between an anode and a cathode opposedly arranged to each other in a discharge tube, comprising means disposed in the discharge tube to support both the electrodes movably along the axial direction of the discharge tube so as to prevent warp of the electrodes on laser oscillation and keep the parallelism therebetween with high accuracy. Also disclosed is a laser apparatus comprising main discharge means for effecting laser oscillation by exciting a laser medium by generating discharge, and preionization means for generating ionization previously to the discharge by the main discharge means so as to stabilize laser oscillation under a high gas pressure and a high current density.

14 Claims, 12 Drawing Sheets

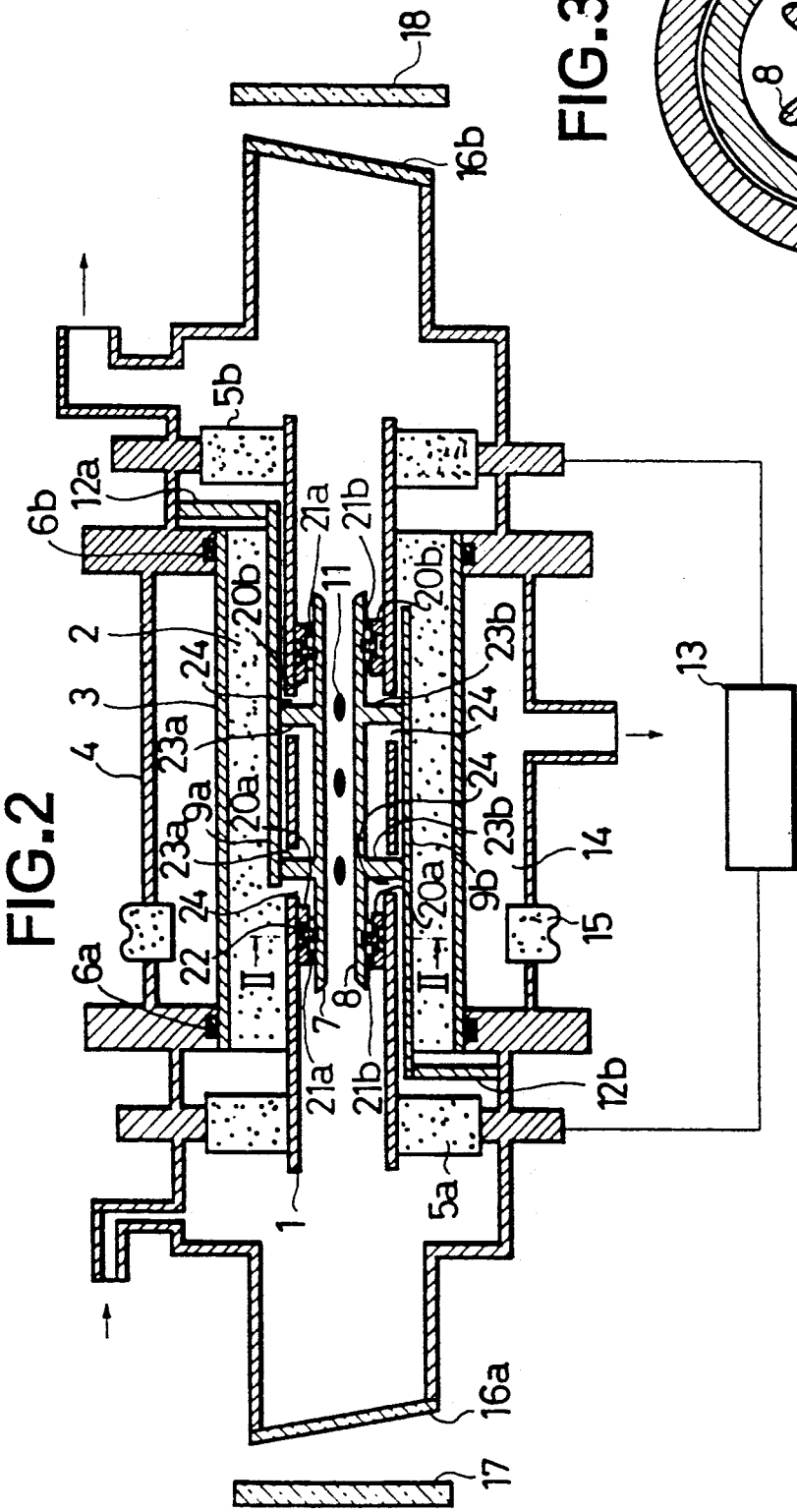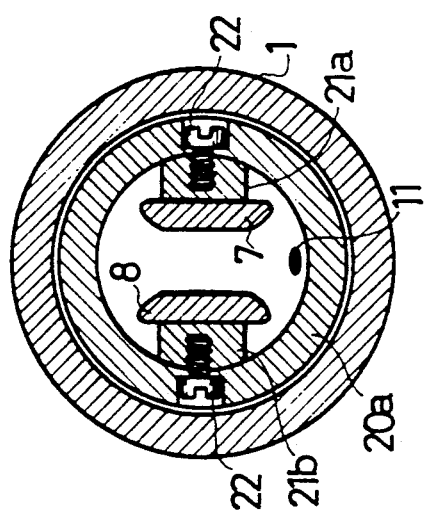

LASER APPARATUS

BACKGROUND OF THE INVENTION

1. Field of the Invention

The present invention relates to a laser apparatus such as a metal-vapor laser apparatus, and particularly to a laser apparatus which can perform stable and high-output laser oscillation.

2. Description of the Prior Art

As a known laser apparatus, for example, there are a metal-vapor laser, a metal-ion laser, an excimer laser and a TEA $CO_2$ laser. Of these, for example, a conventional metal-vapor laser apparatus of a transverse excitation type is so constructed as shown in FIG. 1. As shown in FIG. 1, in the conventional metal-vapor laser apparatus of a transverse excitation type, a discharge tube 1 being made of ceramics excellent in heat resistance is inserted in a protective tube 3 in which a thermal insulating material 2 is filled. The protective tube 3 is inserted in a vacuum container 4 comprising a conductive body. Moreover, the discharge tube 1 is supported by the vacuum container 4 through supporting material 5a, 5b, and the protective tube 3 is supported by the vacuum tube 4 through O rings 6a, 6b.

In the discharge tube 1, an anode 7 and a cathode 8 respectively consisting of molybdenum or the like are arranged to oppose each other along the axial direction. The anode 7 and the cathode 8 are integrally secured by screws 10 together with the discharge tube 1 to current introducing plates 9a, 9b consisting of niobium, molybdenum or the like and extending along the axial direction in the protective tube 3. Namely, the discharge tube 1 and the anode 7 or the cathode 8 are made with different materials. Moreover, in the discharge tube 1, several lumps of metal 11 are placed. Each one end of the current introducing plates 9a, 9b is connected to the vacuum container 4 through current introducing terminals 12a, 12b respectively so that a high-voltage pulse from a pulse power source 13 is applied to the space between the anode 7 and the cathode 8 through the current introducing terminals 12a, 12b and the current introducing plates 9a, 9b in the vacuum container 4.

Between the protective tube 3 and the vacuum container 4, a vacuum thermal insulating chamber 14 is provided to be exhausted by a rotary pump (not shown) when used. Moreover, an insulating tube 15 is disposed in the vacuum container 4 so as to electrically insulate the anode 7 and cathode 8, and the right side thereof shown in the drawing is for the anode 7 and the left side is for the cathode 8.

At both the end openings of the vacuum container 4, windows 16a, 16b are attached, and at both the outsides thereof are disposed a total reflection mirror 17 and an output mirror 18. The interior of the vacuum container 4 sealed up by the attachment of the windows 16a, 16b at both the ends is exhausted by a rotary pump (not shown) to be kept in a vacuum state, and is fed with a buffer gas for discharge, such as He or Ne, from a gas feeding source (not shown).

To carry out laser oscillation by the conventional metal-vapor laser apparatus of a transverse exciting type having the construction as stated above, the vacuum container 4 is exhausted by a rotary pump (not shown) to be kept in a high-vacuum state, then is fed with a buffer gas for discharge, such as He, Ne or the like, from a gas feeding source (not shown). Thereafter, several lumps of metal 11 are placed in the discharge tube 1, and a high-voltage pulse is applied from the pulse power source 13 to the space between the anode 7 and the cathode 8 through the vacuum container 4, the current introducing terminals 12a, 12b, and the current introducing plates 9a, 9b. Then, discharge is generated between the anode 7 and the cathode 8 to elevate the temperature in the discharge tube 1 by Joule heating, then the lumps of metal 11 are vaporized by the heat to be a metal vapor as a laser medium. The metal atoms in the metal vapor are subjected to the pulse discharge, then excited to form the population inversion. Thus, laser oscillation is effected through the windows 16a, 16b by an optical cavity comprising the total reflection mirror 17 and the output mirror 18 disposed at both the outsides of the windows 16a, 16b, thereby outputting a laser beam from the output mirror 17.

However, in the conventional metal-vapor laser apparatus, the temperature of the interior of the discharge tube 1 becomes extremely high when the metal vapor is generated. Moreover, the anode 7 and the cathode 8 are integrally secured by screws 10 to the current introducing plate 9a, 9b together with the discharge tube 1, and materials of the discharge tube 1 and the anode 7 or the cathode 8 are different from each other.

Thus, the difference of the thermal expansion coefficient between the discharge tube 1 and both the electrodes 7 and 8 causes warp of the two electrodes and degrades the parallelism between them. As a results, the discharge becomes unstable and the output of the laser oscillation becomes much degraded by concentration of the discharge.

Moreover, in the conventional metal-vapor laser apparatus of a transverse exciting type, when discharge of a high current density is effected under a high gas pressure between the anode 7 and the cathode 8, the discharge is likely to be concentrated at a particular portion, so that only relatively small output can be obtained.

While, when some metal salts, such as chlorides or bromides, are used in place of the lumps of metal as a source for generating the metal vapor, the temperature in the discharge tube 1 can be decreased at some extent. However, when a halogen gas of chlorine or bromine is generated in the discharge tube 1, the discharge becomes very unstable so that stable laser oscillation can not be obtained.

SUMMARY OF THE INVENTION

The present invention was invented so as to solve the above problems of the prior art, therefore it is an object thereof to provide a laser apparatus which can perform stable and high-output laser oscillation.

It is another object of the present invention to provide a laser apparatus which can prevent warp of the anode and the cathode even when the temperature of the interior of the discharge tube becomes high on laser oscillation so as to keep the parallelism between the anode and the cathode with high accuracy.

It is another object of the present invention to provide a small-scale metal-vapor laser apparatus which can be operated under a high gas pressure and perform discharge of a high current density.

It is still another object of the present invention to provide a metal-vapor laser apparatus which can perform high-output operation even in a small scale.

While, it is a feature of the present invention that in a laser apparatus for performing laser oscillation by exciting a laser medium by effecting discharge between an anode and a cathode which are arranged to oppose each other in a first tube, second tubes having substantially the same axial direction as that of the first tube are disposed in the first tube so as to move along the axial direction, and the anode and the cathode are supported in the second tubes.

Since the anode and the cathode are supported in the second tubes which is disposed movably along the axial direction in the first tube, the second tube can move in the first tube along the axial direction even when the temperature of the first tube becomes high on laser oscillation. Thus, warp of the anode and the cathode caused by difference of the thermal expansion coefficient between the first tube and both the electrodes can be prevented, and the parallelism of between the anodes and the cathode can be kept with high accuracy.

It is another feature of the present invention that in a metal-vapor laser apparatus of a transverse exciting type for performing laser oscillation by exciting a laser medium, such as a metal vapor or a metal vapor ion, by discharge effected between two electrodes, i.e., an anode and a cathode respectively disposed to oppose each other in the vertical direction to an optical axis in a discharge tube or a discharge chamber, a preionization electrode is disposed at at least one of the anode and the cathode.

Namely, since preionization is caused by discharge between the preionization electrode and at least one of the anode and the cathode before main discharge is effected between the anode and the cathode, the main discharge between the anode and the cathode can be stabilized even under a high gas pressure and a high current density.

These and other objects, features and advantages of the present invention will be more apparent from the following description of a preferred embodiment, taken in conjunction with the accompanying drawings.

BRIEF DESCRIPTION OF THE DRAWINGS

FIG. 2 is a schematic cross section to show a first embodiment on a metal-vapor laser apparatus according to the present invention;

FIG. 3 is a cross section taken on line II—II of FIG. 2;

DETAILED DESCRIPTION OF THE EMBODIMENTS

Figure 1:
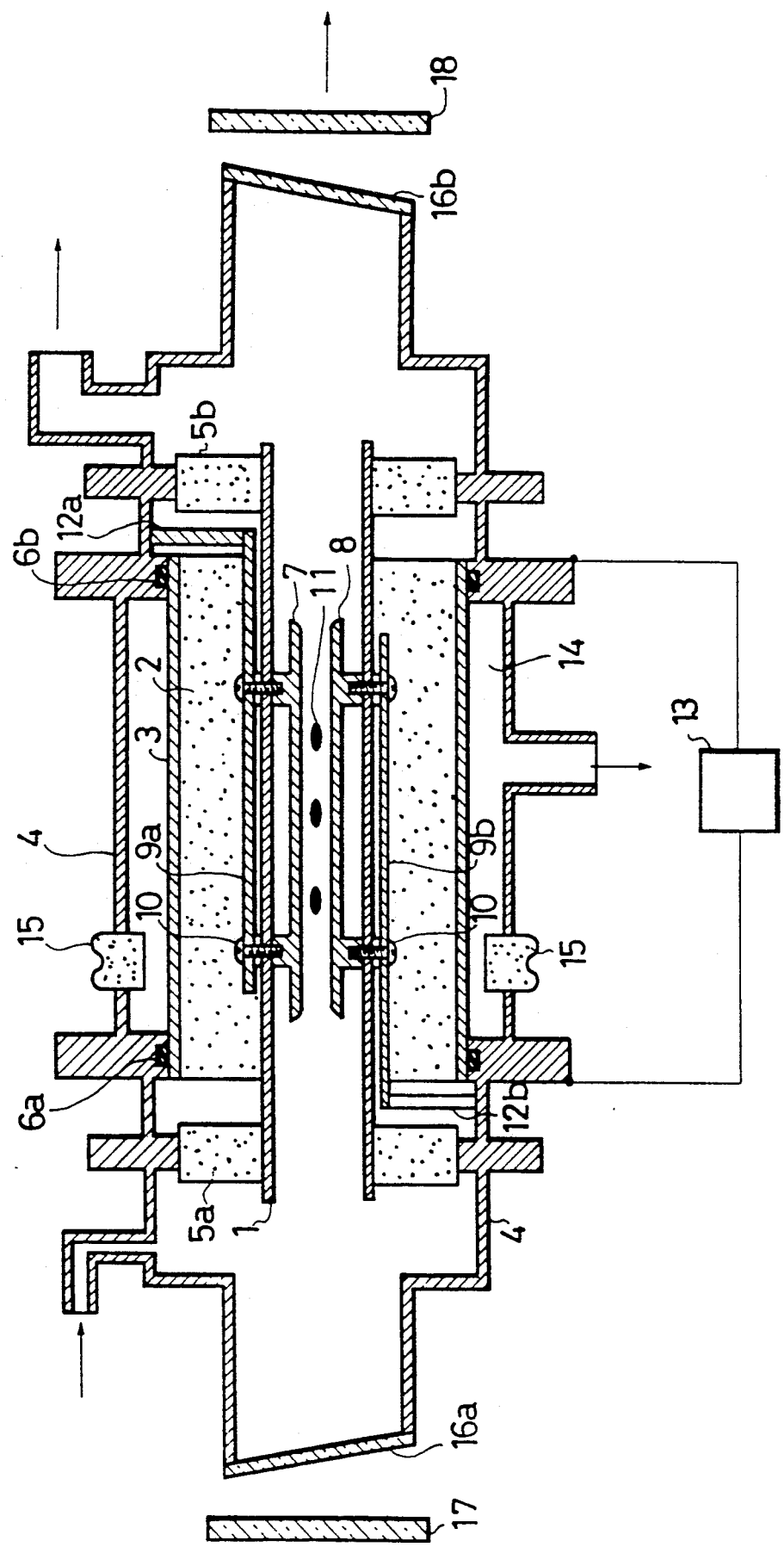
FIG. 1 is a schematic cross section to show a conventional metal-vapor laser apparatus.

FIG. 2 is a schematic cross section to show a first embodiment of a metal-vapor laser apparatus of a transverse exciting type according to the present invention. As shown in the drawing, a cylindrical discharge tube 1 consisting of ceramics as a first tube is inserted in as protective tube 3 in which a thermal insulating material 2 is filled, and the protective tube 3 is inserted in a vacuum container 4. The discharge tube 1 is supported by the vacuum tube 4 through the supporting material 5a, 5b, and the protective tube 3 is supported by the vacuum container 4 through O rings 6a, 6b.

In the discharge tube 1, short tubes 20a, 20b as second tubes consisting of ceramics and having substantially the same axial direction as that of the discharge tube 1 are disposed movably along the axial direction. To the short tubes 20a, 20b, spacers 21a, 21b are respectively secured together with an anode 7 and a cathode 8 by screws 22 so that the anode 7 and the cathode 8 oppose each other (see FIG. 3). At the back of the anode 7 and the cathode 8, conductive rods 23a, 23b for current introduction are respectively secured, and the conductive rods 23a, 23b are connected through holes 24 formed in the discharge tube 1, to current introducing plates 9a, 9b respectively formed in thin plates with a thickness about 0.5 mm or less consisting of niobium, molybdenum or the like, and are disposed along the axial direction in the protective tube 3. The holes 24 are formed more largely than the conductive rods 23a, 23b to give spaces therebetween so that the conductive rods 23a, 23b would not contact with the edges of the holes 24 even when these rods 23a, 23b are moved with the anode 7 and the cathode 8 by heat generated on the laser oscillation. One ends of the current introducing plates 9a, 9b are connected to the vacuum container 4 through current introducing terminals 12a, 12b. Between the anode 7 and the cathode 8, a high-voltage pulse is applied from a pulse power source 13 through the vacuum container 4, the current introducing terminals 12a, 12b, the current introducing plates 9a, 9b and the conductive rods 23a, 23b.

While, constructions of lumps of metal 11, such as copper, gold, cadmium, strontium, manganese, calcium, or barium, a vacuum thermal insulating chamber 14 formed by exhaustion by a rotary pump (not shown), insulating tubes 15 for electrically insulating the vacuum container 4, windows 16a, 16b, a total reflection mirror 17 and an output mirror 18 are respectively similar to those of the conventional metal-vapor laser apparatus as described in FIG. 1.

The first embodiment of a metal-vapor laser apparatus according to the present invention is so constructed as stated above, and when it performs laser oscillation, the vacuum container 4 is exhausted by a rotary pump (not shown) to be kept in a high vacuum state, then a buffer gas for discharge, such as He, Ne or the like, is fed from a gas feeding source (not shown). Then, several lumps of a suitable metal 11 are placed in the discharge tube 1, and a high-voltage pulse is applied from the pulse power source 13 through the vacuum container 4, the current introducing terminals 12a, 12b, the current introducing plates 9a, 9b and the conductive rods 23a, 23b to the space between the anode 7 and the cathode 8. As the result, discharge is generated between the anode 7 and the cathode 8 and the temperature in the discharge tube 1 becomes high owing to the Joule heating of the discharge, so that the lumps of metal 11 are vaporized and metal vapor to be a laser medium is generated. Thereafter, the metal atoms in the metal vapor are excited by the pulse discharge to form the population inversion, so that laser oscillation is generated by an optical cavity comprising the total reflection mirror 17 and the output mirror 18, thereby outputting a laser beam from the output mirror 18.

At the time, since the interior of the discharge tube 1 is in a high temperature state, the discharge tube 1, the anode 7, the cathode 8 and the short tubes 20a, 20b are expanded by heat. The thermal expansion coefficient of the discharge tube 1 and the short tubes 20a, 20b in the radial direction is same because the discharge tube 1 and the short tubes 20a, 20b consist of the same material, i.e., ceramics. Thus, the spaces between the discharge tube 1 and the short tubes 20a, 20b are kept constant.

Since the short tubes 20a, 20b and the discharge tube 1 are formed with the same material of ceramics, breakage of the discharge tube 1 can be prevented when the heat expansion of the discharge tube 1 and the short tubes 20a, 20b is caused respectively. Moreover, even when the heat expansion of the anode 7 and the cathode 8 in the axial direction is caused, the heat expansion is cancelled by the movement of the short tubes 20a, 20b to the discharge tube 1 in the axial direction, thus generation of the warp can be prevented, and the parallelism between the anode 7 and the cathode 8 can be kept with high accuracy.

Moreover, in case that the spaces between the discharge tubes 1 and the short tube 20a, 20b are relatively large, since the anode 7 and the cathode 8 are fixed at the short tubes 20a, 20b with opposing each other through the spacer 21a, 21b, the relative positional accuracy between the anode 7 and the cathode 8 can be suitably kept even when the relative positional relationships between the discharge tube 1 and the short tubes 20a, 20b becomes a little unfixed.

In the embodiment, though the material of the discharge tube 1 and the short tubes 20a, 20b is ceramics in common, it is possible to form the short tubes 20a, 20b with another material having excellent high resistance by providing that the space to the discharge tube 1 is kept enough.

Incidentally, since the current introducing plates 9a, 9b are respectively formed in thin plates, the heat conductivity becomes so decreased that the heat generated in the discharge tube 1 can be retained to hold high-temperature in the discharge tube 1.

Figure 4:
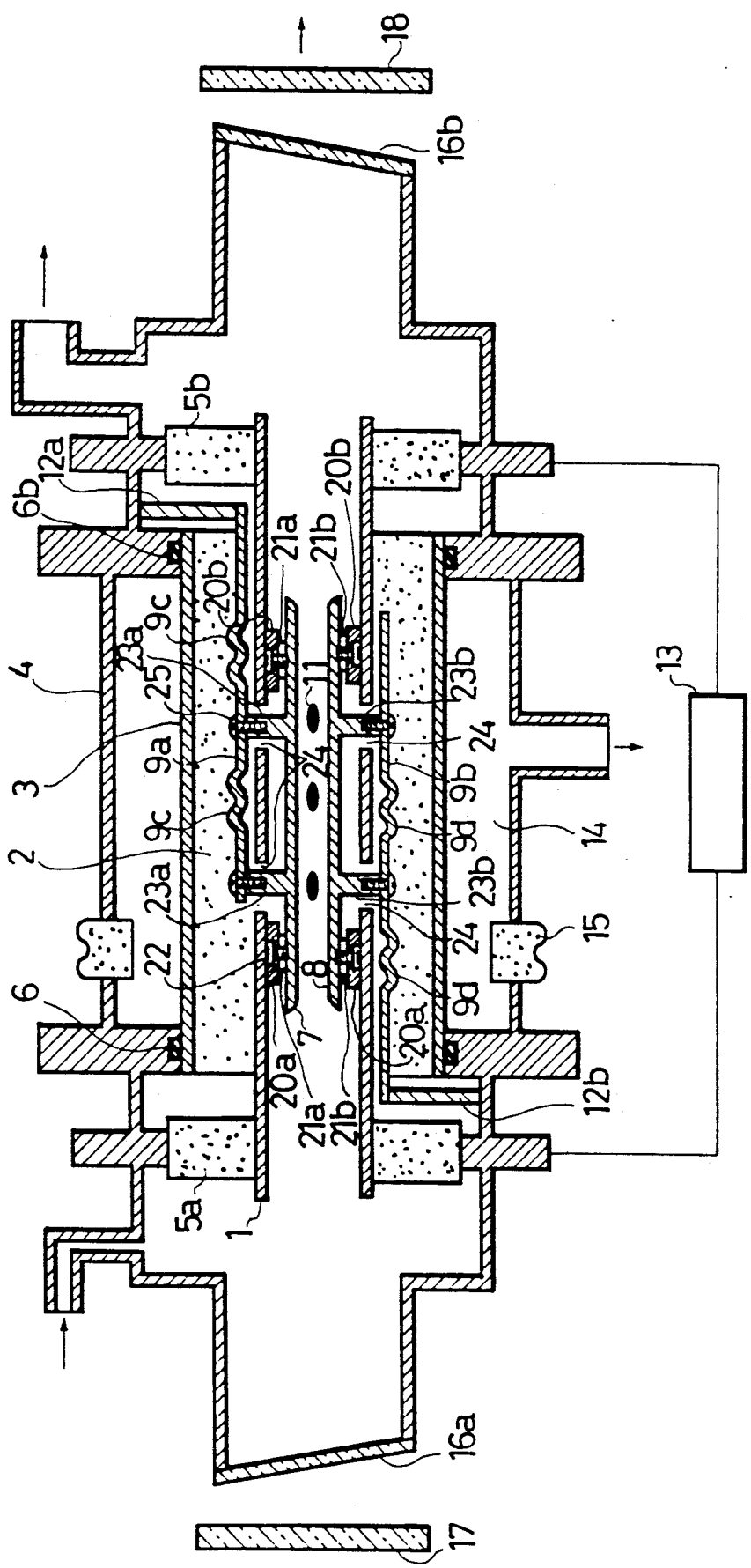
FIG. 4 through 6 are schematic cross sections to respectively show modified examples of the first embodiment on a laser apparatus shown in FIG. 2.

FIG. 4 is a schematic cross section to show a modified example of the first embodiment.

In the modified example, wave-shaped flexible portions 9c, 9d are respectively formed at portions of the current introducing plates 9a, 9b, and the current introducing plates 9a, 9b are secured at the conductive rods 23a, 23b with screws 25. The other constructions are similar to those described in the first embodiment.

Accordingly, in the modified example, when the anode 7 and the cathode 8 are moved together with the short tubes 20a, 20b in the axial direction of the discharge tube 1 by heat expansion in a high-temperature state on laser oscillation, the flexible portions 9c, 9d of the current introducing plates 9a, 9b connected to the anode 7 and the cathode 8 through the conductive rods 23a, 23b are changed in shape in the axial direction, so that warp caused between the conductive rods 23a, 23b or between the conductive rods 23a, 23b and the current introducing terminals 12a, 12b by heat expansion can be prevented, the parallelism between the anode 7 and the cathode 8 can be kept with high accuracy.

Figure 5:
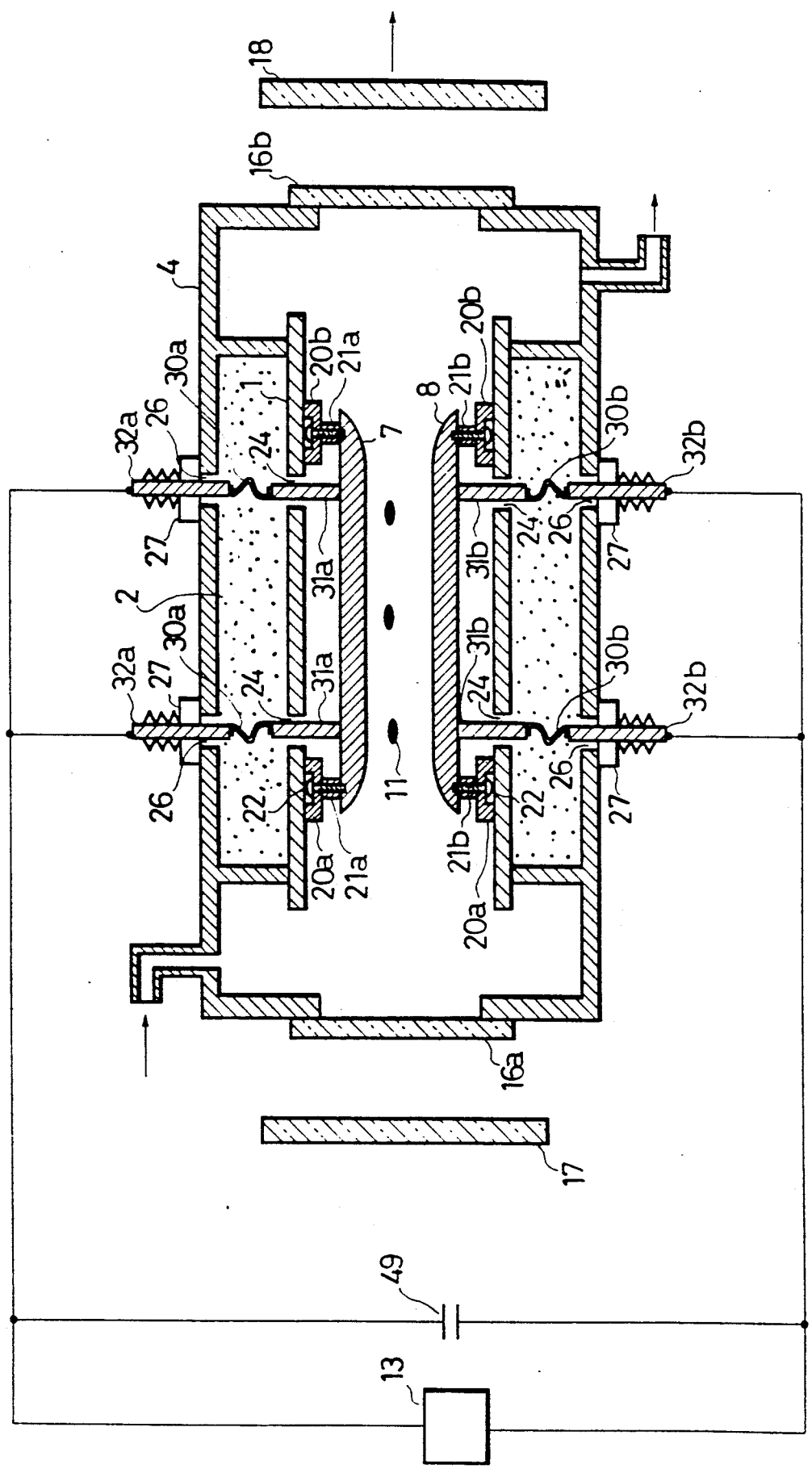

FIG. 5 is a schematic diagram to show another modified example of the first embodiment.

In the modified example, the respectively two short tubes 20a, 20b which are movable in the axial direction are disposed in the discharge tube 1 inserted in the vacuum container 4. To the short tubes 20a, 20b, the anode 7 and the cathode 8 are secured by screws 22 with opposing each other through spacers 21a, 21b. At the back of the anode 7 and the cathode 8, respectively two holes 24, 26 are formed in the discharge tube 1 and the vacuum container 4, and in the holes 24, 26 are inserted conductive rods 31a, 31b and current introducing terminals 32a, 32b between which are respectively attached current introducing plates 30a, 30b formed in flexible and wave-formed thin plates. The conductive rods 31a, 31b inserted in the holes 24 are connected to the rear faces of the anode 7 and the cathode 8 respectively, and the current introducing terminals 32a, 32b inserted in the holes 26 are fixed at the surface of the vacuum container 4 with insulating members 27. The holes 24 are formed more largely than the conductive rods 31a, 31b to form spaces therebetween, so that the conductive rods 31a, 31b would not contact with the edges of the holes 24 when heat expansion is caused by heat on laser oscillation.

Moreover, since the current introducing plates 30a, 30b are formed in flexible, warp to be caused by heat expansion between the conductive rods 31a, 31b and the current introducing terminals 32a, 32b in a high temperature state on laser oscillation can be absorbed.

Moreover, the current introducing terminals 32a, 32b are connected to a pulse power source 13, and a high-voltage pulse is applied from the pulse power source 13 to the anode 7 and the cathode 8 through the current introducing terminals 32a, 32b, the current introducing plates 30a, 30b and the conductive rods 31a, 31b.

Incidentally, reference numeral 2 designates a thermal insulating material, 16a, 16b designate windows, 17 designates a total reflection mirror and 18 designates an output mirror.

Also, in the modified example, as similar to the description on the first embodiment, the vacuum container 4 is exhausted into a high vacuum state by a rotary pump (not shown), then fed with a buffer gas for discharge, such as He, Ne or the like from a gas feeding source (not know). Then, lumps of some metal (not shown) are placed in the discharge tube 1, and a high voltage is applied between the anode 7 and the cathode 8 from the pulse power source 13 to generate a metal vapor. The metal atoms in the metal vapor are excited by the pulse discharge to form the population inversion, so that a laser beam is emitted from the output mirror 18 by laser oscillation effected from an optical cavity comprising the total reflection mirror 17 and the output mirror 18.

Moreover, in the modified example, as similar to the first embodiment, when the anode 7 and the cathode 8 are moved in the axial direction of the discharge tube 1 together with the short tubes 20a, 20b by heat expansion on the laser discharge in a high-temperature state, since the wave-formed current introducing plates 30a, 30b connected to the anode 7 and the cathode 8 through the conductive rods 31a, 31b are changed in shape in the axial direction thereof, warp between the current introducing plates 30a, 30b and the conductive rods 31a, 31b by heat expansion can be prevented, and the parallelism between the anode 7 and the cathode 8 can be kept with high accuracy.

Incidentally, since a high-voltage pulse is applied from the pulse power source 13 to the anode 7 and the cathode 8 through the current introducing terminals 32a, 32b, the introducing plates 30a, 30b and the conductive 31a, 31b which are respectively inserted in the holes 24, 26 formed in the faces of the discharge tube 1 and the vacuum container 4, the length of the circuit can be reduced, thereby decreasing the inductance of the circuit. Accordingly, the rise time of current can be shortened and the peak value of current can be enlarged so that laser oscillation with high efficiency and high output can be obtained.

Figure 6:
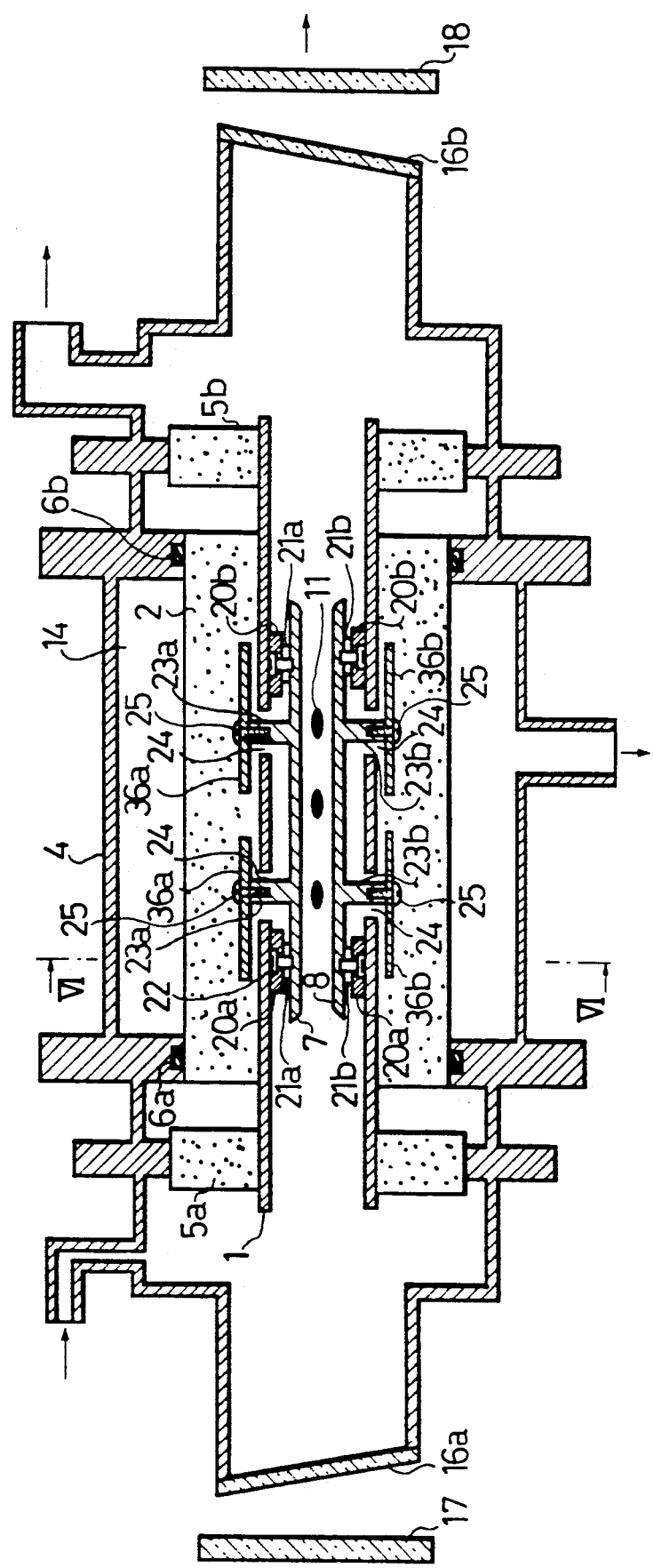
Figure 7:
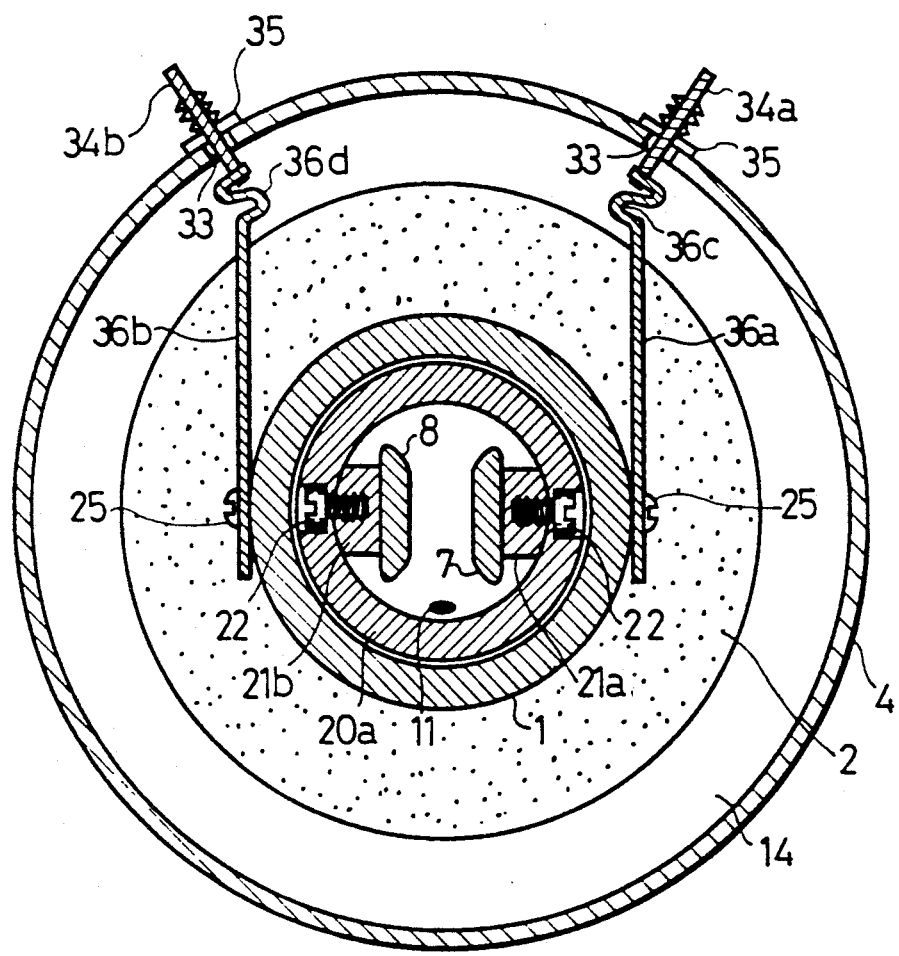
FIG. 7 is a cross section taken on line VI—VI of FIG. 6.

FIG. 6 is a schematic cross section to show still another modified example of the first embodiment, and FIG. 7 is as cross section taken on line VI—VI of FIG. 6.

In the modified example, as shown in FIG. 7, holes 33 are formed in the face of the vacuum container 4, and current introducing terminals 34a, 34b are inserted in the holes 33 and fixed at the face of the vacuum container 4 with insulating members 35. To the outsides of the current introducing terminals 34a, 34b is connected a pulse power source (not shown), and to the insides thereof are connected current introducing plates 36a, 36b formed in thin plates and having wave-formed flexible portions 36c, 36d. The current introducing plates 36a, 36b are secured with screws 25 to conductive rods 23a, 23b connected to the anode 7 and the cathode 8. The other constructions are similar to those described in the first embodiment shown in FIG. 2.

As stated above, in the example, since a high-voltage pulse is applied from a pulse power source (not shown) to the anode 7 and the cathode 8 through the current introducing terminals 34a, 34b inserted in the holes 33 formed in the face of the discharge tube 1, the current introducing plates 36a, 36b and conductive rods 23a, 23b, the circuit can be more shortened than that in the modified example shown in FIG. 5, and the inductance of the circuit can be reduced. Accordingly, the peak value of the current can be so enlarged as to effect laser oscillation with high efficiency and high accuracy.

Moreover, since the flexible portions 36c, 36d are formed in the current introducing plates 36a, 36b, warp to be caused by heat expansion between the conductive rods 23a, 23b and the current introducing terminals 34a, 34b in a high temperature state on laser oscillation can be absorbed.

Incidentally, though the above embodiment was described on a metal-vapor laser apparatus of a transverse exciting type, it is also possible to apply the present invention to a laser apparatus of a transverse exciting type of an excimer laser, a TEA $CO_2$ gas laser and the like.

While, in the above embodiment, though the discharge tube 1 was in a cylindrical shape, it is possible to use another discharge tube whose cross section is in a polygonal shape.

While, it is possible to connect a capacitor for shaping the current wave form to the pulse power source 3 for applying a high-voltage pulse to the anode 7 and the cathode 8.

While, it is possible to apply the present invention to a laser apparatus in which breakage of the discharge tube is happened with a bombard of the anode and cathode by an applying of a high-voltage pulse.

As described in detail, according to the first embodiment of the present invention, since the anode and the cathode are supported by the second tubes movably disposed in the first tube, heat expansion of the anode and the cathode in the axial direction caused by a high temperature in the discharge tube on laser oscillation can be absorbed by the movement of the second tube in the axial direction. Thus, the warp of the anode and the cathode can be prevented, and the parallelism between the anode and the cathode can be kept with high accuracy.

Accordingly, the discharge generated between the anode and the cathode is stabilized, and stable and high-output laser oscillation can be guaranteed.

Figure 8:
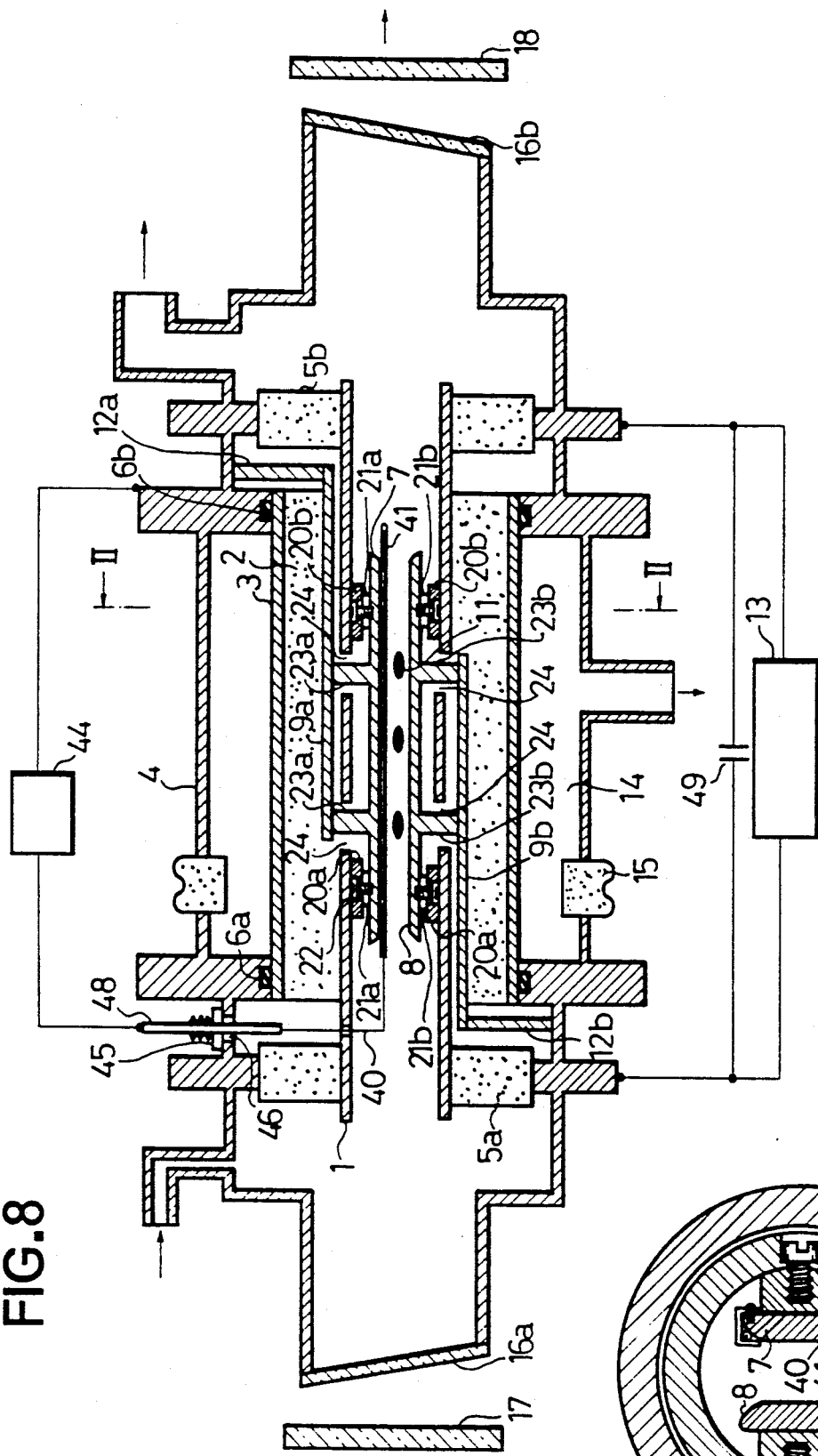
FIG. 8 is a schematic cross section to show a second embodiment on a metal-vapor laser apparatus according to the present invention.

FIG. 8 is a schematic cross section of a second embodiment on a metal-vapor laser apparatus according to the present invention.

In the second embodiment, as is similar to the first embodiment, a discharge tube 1, i.e., a first tube consisting of ceramics is inserted in a protective tube 3 in which a thermal insulating material 2 is filled, and the protective tube 3 is inserted in a vacuum container 4. The discharge tube 1 is supported by the vacuum container 4 through thermal insulating materials 5a, 5b, and the protective tube 3 is supported by the container 4 through O rings 6a, 6b.

In the discharge tube 1, short tubes 20a, 20b as second tubes consisting of ceramics and having substantially the same axial direction as that of the discharge tube 1 are disposed movably along the axial direction. To the short tubes 20a, 20b, spacers 21a, 21b are respectively secured together with an anode 7 and a cathode 8 by screws 22 so that the anode 7 and the cathode 8 oppose each other (see FIG. 9). At the back of the anode 7 and the cathode 8, conductive rods 23a, 23b for current introduction are respectively secured, and the conductive rods 23a, 23b are connected through holes 24 formed in the discharge tube 1 to current introducing plates 9a, 9b respectively formed in thin plates with a thickness about 0.5 mm or less consisting of niobium, molybdenum or the like, and are disposed along the axial direction in the protective tube 3. The holes 24 are formed more largely than the conductive rods 23a, 23b to give spaces therebetween so that the conductive rods 23a, 23b would not contact with the edges of the holes 24 even when these rods 23a, 23b are expanded by heat on the laser oscillation. One ends of the current introducing plates 9a, 9b are connected to the vacuum container 4 through current introducing terminals 12a, 12b. Between the anode 7 and the cathode 8, a high-voltage pulse is applied from a pulse power source 13 through the vacuum container 4, the current introducing terminals 12a, 12b, the current introducing plates 9a, 9b and the conductive rods 23a, 23b.

Figure 9:
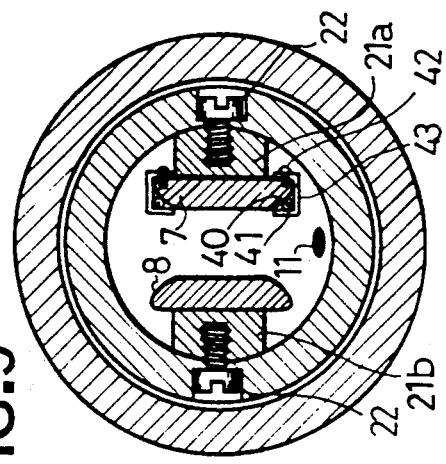
FIG. 9 is a cross section taken on line II—II of FIG. 8.

Moreover, in the second embodiment, a ceramic tube 41 in which a preionization electrode 40 is inserted, is disposed on the surface of the anode 7 along the transverse direction thereof, and is supported by a plurality of fixing members 43 made of ceramics and secured to the anode by screws 42 (see FIG. 9). To the preionization electrode 40, a pulse power source 44 is connected through a current introducing terminal 48 which is insulatedly inserted through an insulating member 45 in a hole 46 formed in the face of the vacuum container 4, so that a high-voltage pulse is applied form the power source 44 between the anode 7 and the preionization electrode 40 to generate corona discharge.

The metal vapor laser apparatus related to the second embodiment of the present invention is constructed as stated above, and when laser oscillation is performed, the vacuum container 4 is exhausted in a high vacuum state by a rotary pump (not shown), then fed with a buffer gas for discharge, such as He, Ne or the like, from a gas feeding source (not shown). Then, several lumps of suitable metal 11 are placed in the discharge tube 1, and a high-voltage pulse is applied between the anode 7 and the cathode 8 from the pulse power source 13 through the vacuum container 4, the current introducing terminals 12a, 12b, the current introducing plates 9a, 9b and the conductive rods 23a, 23b. Thus, discharge is generated between the anode 7 and the cathode 8, and the metal 11 are vaporized by heating them with the Joule heating generated by the discharge in the discharge tube 1 to form a metal vapor as a laser medium.

As described above, in the embodiment, the Joule heating by discharge is used as heating means for metal 11. Thereafter, the metal atoms in the metal vapor are excited by the pulse discharge to generate the population inversion, so that laser oscillation is caused in an optical cavity comprising a total reflection mirror 17 and an output mirror 18 respectively placed at the outsides of windows 16a, 16b.

At the time, corona discharge is generated by applying a high-voltage pulse from the pulse power source 44 between the anode 7 and the preionization electrode 40 to generate electrons in the discharge tube 1 before the laser oscillation, that is, scores of nanoseconds to several microseconds before the high-voltage pulse is applied from the pulse power source 13 between the anode 7 and the cathode 8.

Since the corona discharge is generated between the anode 7 and the preionization electrode 40 to effect preionization, the main discharge between the anode 7 and the cathode 8 is stabilized, thus it becomes possible to generate discharge high-efficient and high-output laser oscillation in a small scale.

Moreover, since the preionization electrode 40 is provided, a maximum electric power effectively used to the stable discharge between the anode 7 and the cathode 8 is experimentally confirmed to be 5 to 10 times as large as the case in which the preionization electrode 40 is not provided.

In the discharge operation, since the temperature in the discharge tube 1 becomes so high as to generate heat expansion of the discharge tube 1, the anode 7, the cathode 8 and the short tubes 20a, 20b. As similar to the first embodiment, the heat expansion ratios of the discharge tube 1 and the short tubes 20a, 20b in the radial direction are same because the discharge tube 1 and the short tubes 20a, 20b consist of the same material of ceramics. Thus, the spaces formed between the discharge tube 1 and the short tubes 20a, 20b are kept constant.

Accordingly, since the short tubes 20a, 20b and the discharge tube 1 are made with the same material of ceramics, the breakage of the discharge tube 1 can be prevented when the heat expansion is caused on the discharge tube 1 and the short tubes 20a, 20b. Moreover, since the short tubes 20a, 20b are movable in the axial direction to the discharge tube 1, heat expansion of the anode 7 and the cathode 8 can absorbed to prevent warp thereof and the parallelism between the anode 7 and the cathode 8 can be kept with high accuracy when the heat expansion of the two electrodes 7, 8 in the axial direction is generated.

Figure 10:
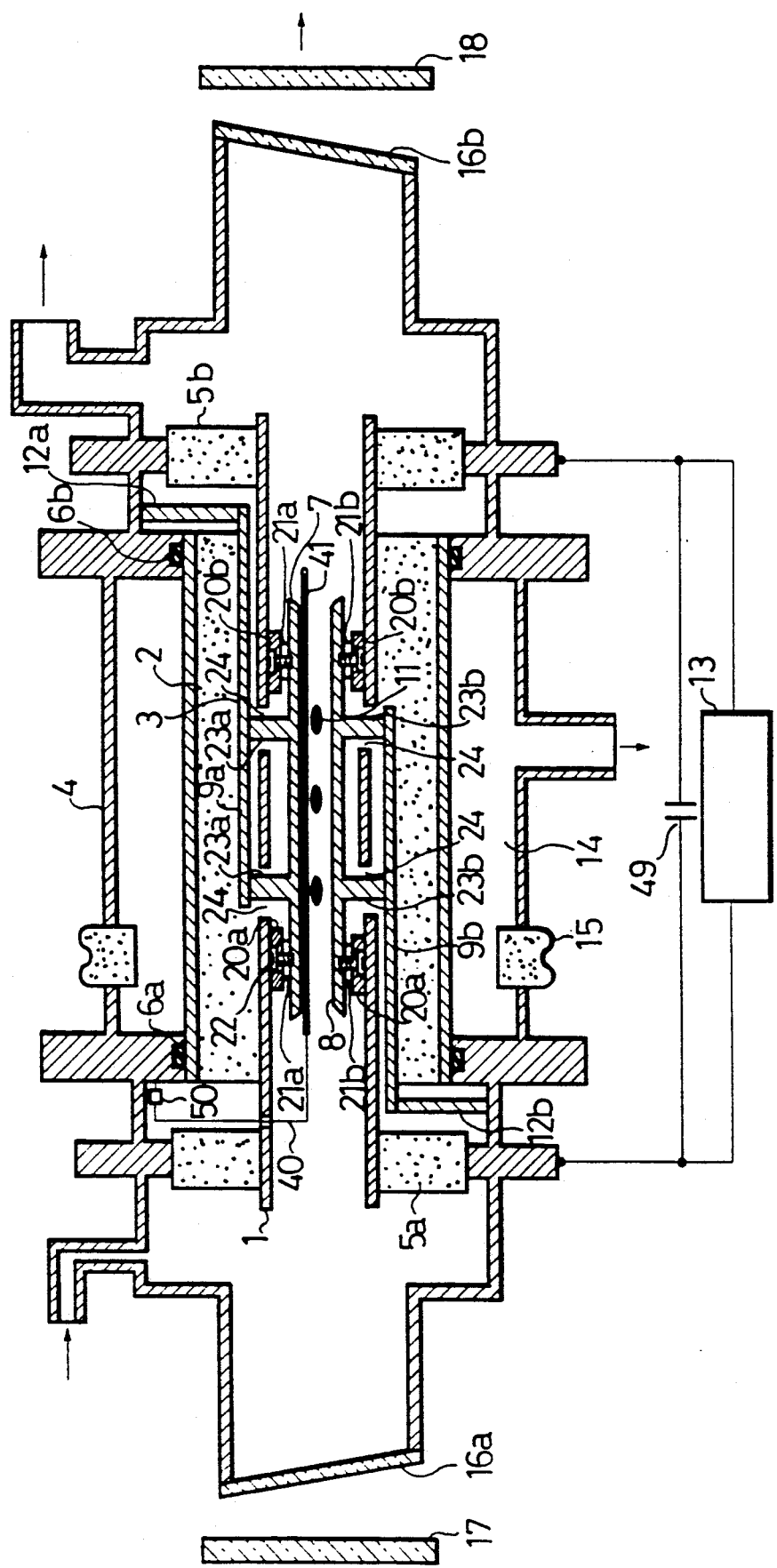
FIGS. 10 through 14 are schematic cross sections to respectively show modified examples of the second embodiment on a laser apparatus shown in FIG. 8.

FIG. 10 is a schematic cross section to show a modified example of a metal-vapor laser apparatus of the second embodiment.

In the modified example, the preionization electrode 40 is connected to the vacuum container 4 through a capacitor 50, a pulse power source of the preionization electrode 40 is so constructed as to be the pulse power source 13 for applying a high-voltage pulse between the anode 7 and the cathode 8 in common. By the pulse power source 13, preionization is effected by applying a high-voltage pulse to the preionization electrode 40 through the capacitor 50 as well as generating the discharge between the anode 7 and the cathode 8. At the time, owing to the difference of circuit impedance and of the peak value of current between the main discharge and the preionization, the preionization current reaches its peak earlier, thereby effecting preionization. The other constructions are similar to those in the second embodiment.

As stated above, also in the modified example, the preionization is effected by applying a high-voltage pulse from the pulse power source 13 to the preionization electrode 40. Thus, there can be realized stable discharge even under a high gas pressure and a high current density.

Figure 11:
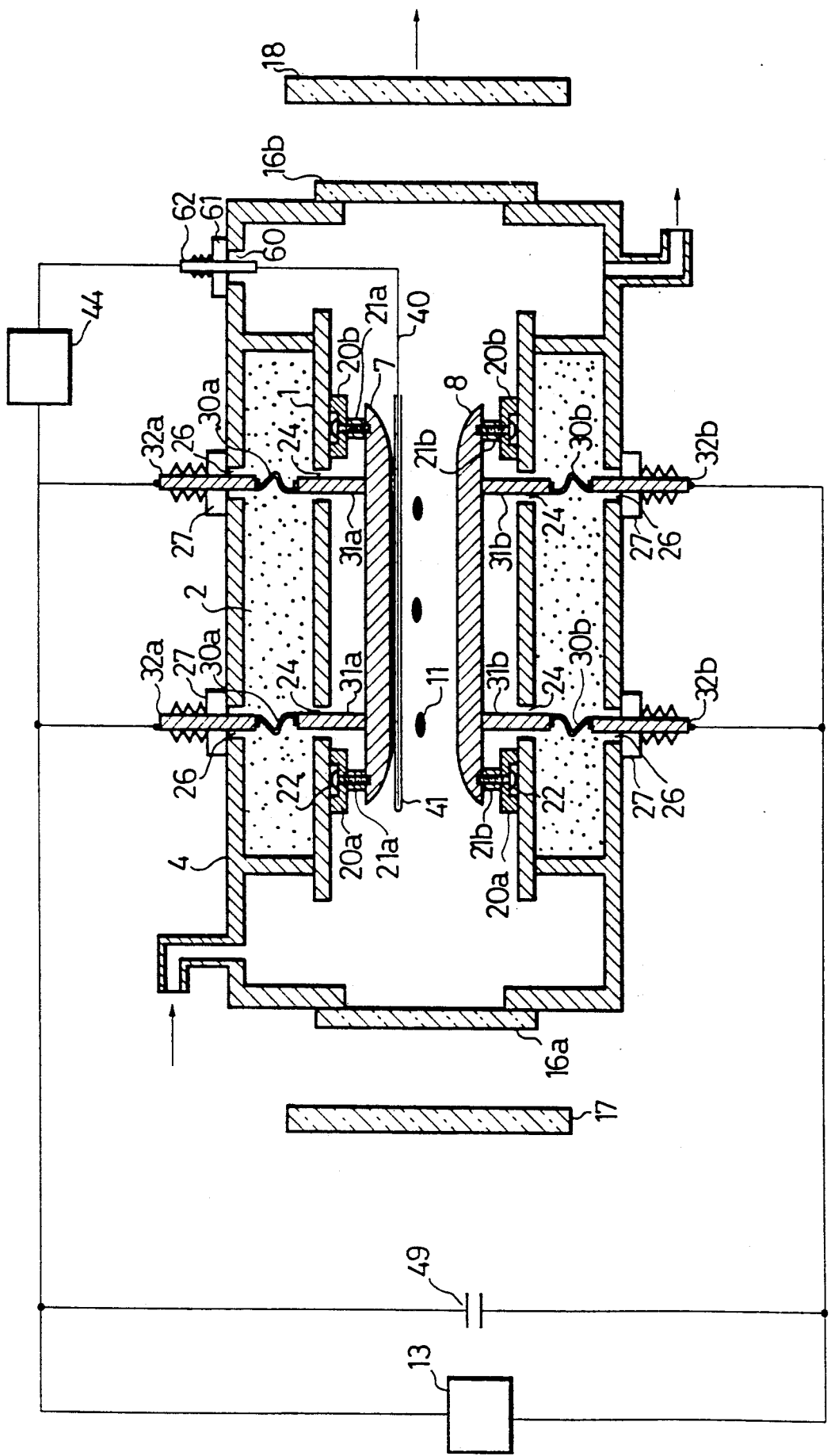

FIG. 11 is a schematic cross section to show a metal-vapor laser apparatus related to another modified example of the second embodiment.

In the modified example, the respectively two short tubes 20a, 20b are disposed movably along the axial direction of the discharge tube 1 inserted in the vacuum container 4. To the short tubes 20a, 20b, the anode 7 and the cathode 8 are secured to oppose each other through spacers 21a, 21b with screws 22. In portions of the discharge tube 1 and the vacuum container 4 opposing the backs of the anode 7 and the cathode 8, respectively two holes 24, 26 are formed. Moreover, in the holes 24, 26, conductive rods 31a, 31b and current introducing terminals 32a, 32b between which are attached current introducing plates 30a, 30b of flexible and wave-shaped thin plates. The conductive rods 31a, 31b inserted in the holes 24 are respectively connected to the backs of the anode 7 and the cathode 8. While, the current introducing terminals inserted in the holes 26 are respectively fixed at the surface of the vacuum container 4 with insulating members 27. The sizes of the holes 24 are larger than those of the conductive rods 31a, 31b to form spaces therebetween so that the conductive rods 31a, 31b would not contact with the edges of the holes 24 by heat expansion caused on laser oscillation.

Moreover, since the current introducing plates 30a, 30b are formed in flexible, warp to be caused by heat expansion between the conductive rods 31a, 31b and the current introducing terminals 32a, 32b in a high temperature state on laser oscillation can be absorbed.

Moreover, a hole 60 is formed in the surface of the vacuum container 4. In the hole 60, a current introducing terminal 62 is inserted through an insulating member 61. Further, the pulse power source 44 is connected to the preionization electrode 40 through the current introducing terminal 62. Thus, a high-voltage pulse is applied between the anode 7 and the cathode 8 through the current introducing terminals 32a, 32b, the current introducing plates 30a, 30b and the conductive rods 31a, 31b. While another high-voltage pulse is applied from the power source 44 between the anode 7 and the preionization electrode 40 to generate corona discharge.

Also in the modified example, as similar to the second embodiment, the vacuum container 4 is exhausted by a rotary pump (not shown) into a high vacuum state, then is fed with a buffer gas for discharge, such as He, Ne or the like, from a gas feeding source (not shown). Then, several tens of nanoseconds to several microseconds before the main discharge is generated by applying a high-voltage pulse from the pulse power source 13 between the anode 7 and the cathode 8, the preionization is effected by generating corona discharge between the preionization electrode 40 and the anode 7 by applying a high-voltage pulse from the pulse power source 44 to the preparatory electrode 40. As the result, there can be realized stable discharge under a high gas pressure and a high current density.

Moreover, in the modified example, as similar to the second embodiment, when the anode 7 and the cathode 8 are moved in the axial direction of the discharge tube 1 together with the short tubes 20a, 20b by heat expansion on the laser discharge in a high-temperature state, since the wave-formed current introducing plates 30a, 30b connected to the anode 7 and the cathode 8 through the conductive rods 31a, 31b are changed in shape in the axial direction thereof, warp between the current introducing plates 30a, 30b and the conductive rods 31a, 31b by heat expansion can be prevented, and the parallelism between the anode 7 and the cathode 8 can be kept with high accuracy.

Incidentally, since a high-voltage pulse is applied from the pulse power source 13 to the anode 7 and the cathode 8 through the current introducing terminals 32a, 32b, the introducing plates 30a, 30b and the conductive rods 31a, 31b which are respectively inserted in the holes 24, 26 formed in the faces of the discharge tube 1 and the vacuum container 4, the length of the circuit can be reduced, thereby decreasing the inductance of the circuit. Accordingly, the rise time of current can be shortened and the peak value of current can be enlarged so that laser oscillation with high efficiency and high output can be obtained.

Figure 12:
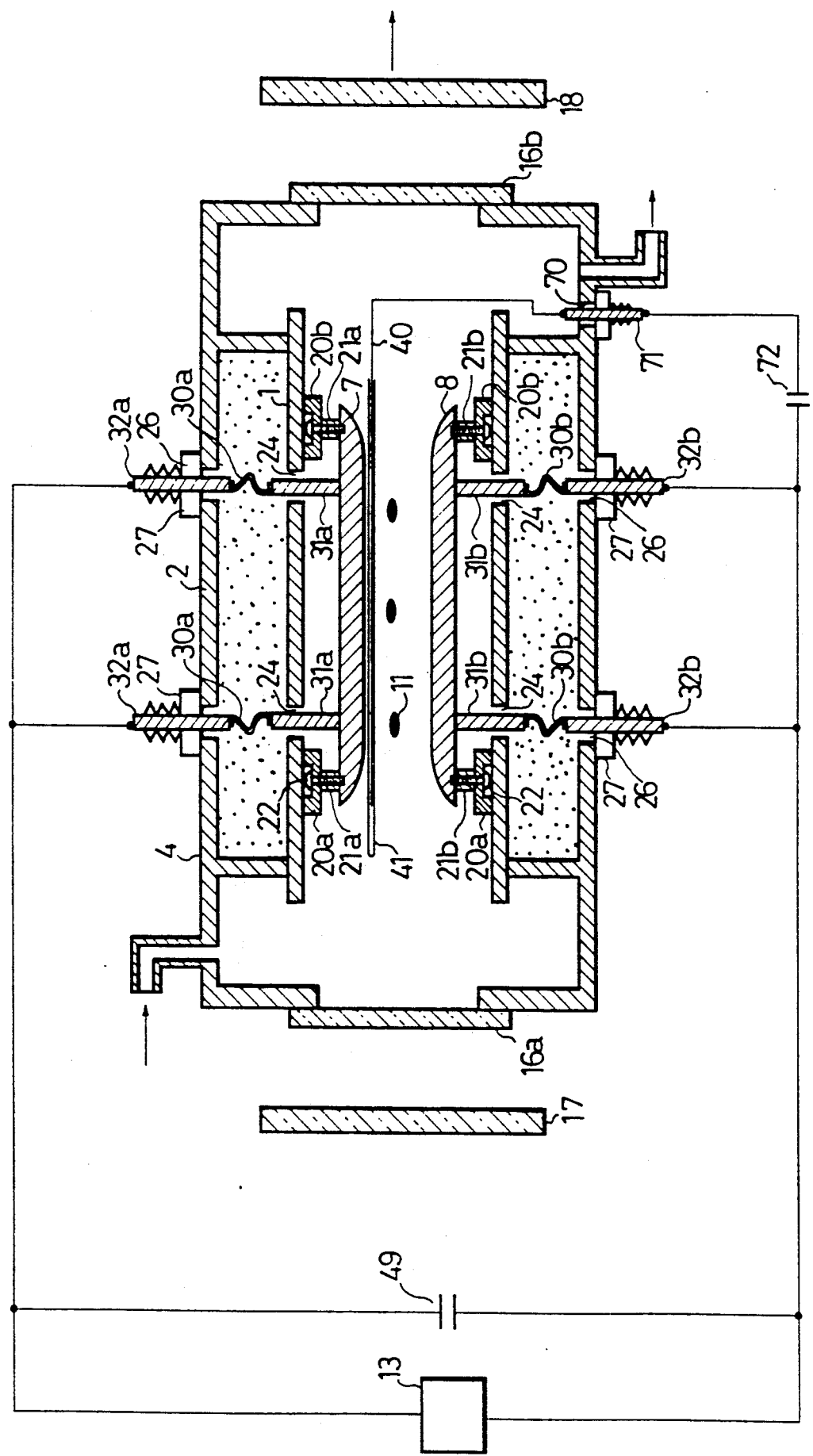

FIG. 12 is another modified example of a metal-vapor laser apparatus related to the second embodiment.

In the modified example, the preionization electrode 40 is connected to the pulse power source 13 for applying a high-voltage pulse between the anode 7 and the cathode 8 through a current introducing terminal 71 inserted in a hole 70 and a capacitor 72 so that the pulse power source 13 is also used for the preionization electrode 40 without providing another specific pulse power source thereof. Accordingly, the pulse power source 13 generates the preionization discharge by applying a high-voltage pulse to the preionization electrode 40 through the capacitor 72 and the current introducing terminal 71 as well as generating the main discharge between the anode 7 and the cathode 8. At the time, owing to the difference of the circuit impedance and of the peak value of current between the main discharge and the preionization, the preionization current reaches its peak earlier than the other, and the preionization is effected. The other constructions are similar to those described in the modified example in FIG. 11.

Accordingly, owing to the preionization generated by applying a high-voltage pulse from the pulse power source to the preionization electrode 40 as in the foregoing example, there can be effected stable discharge under a high gas pressure and a high current density.

Figure 13:
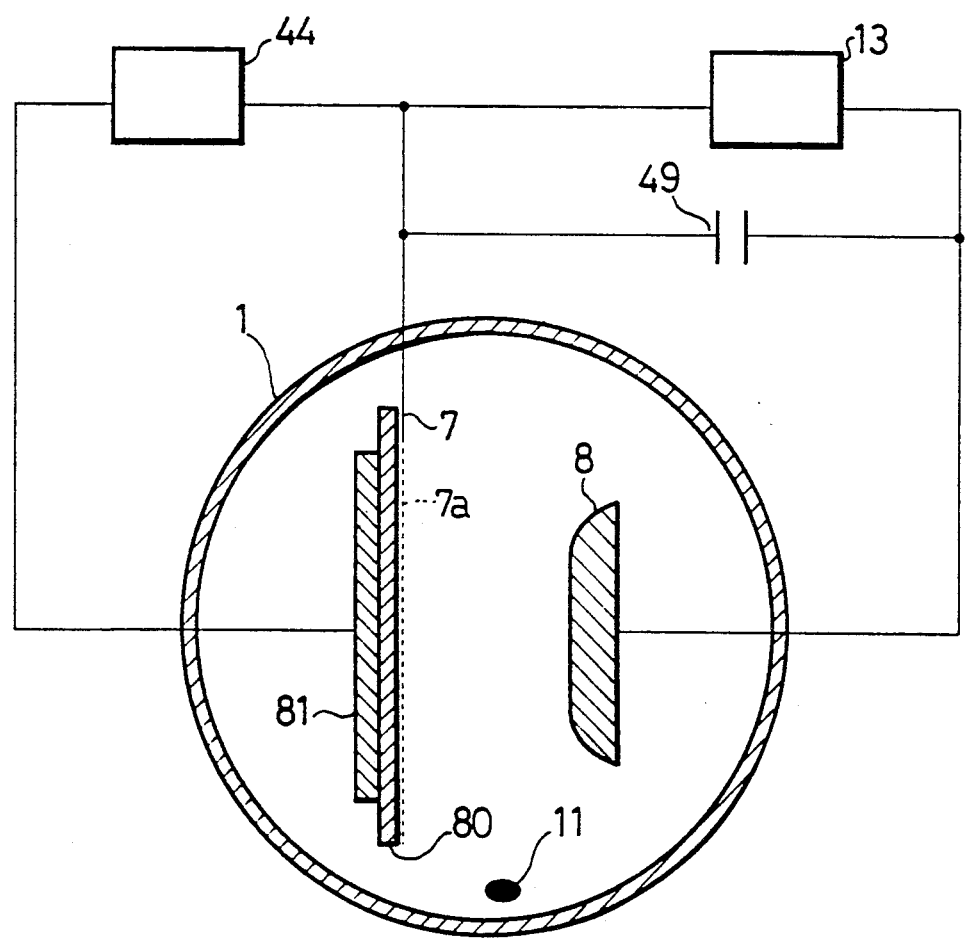

FIG. 13 is a schematic cross section to show an important part of another modified example of a metal-vapor laser apparatus related to the second embodiment.

In the modified example, a plurality of holes 7a are formed in the anode 7, and the anode 7 and the cathode 8 are opposedly arranged in the discharge tube 1 along the axial direction thereof, further a preionization electrode 81 is disposed on the opposite face of the anode 7 to the cathode 8 through a ceramic plate 80. Moreover, a pulse power source 44 is connected between the anode 7 and the preionization electrode 81 as well as the pulse power source and a capacitor 49 are connected between the anode 7 and the cathode 8. The other constructions are similar to those described in the embodiments shown in FIGS. 8 and 11.

Also in the modified example as similar to the above embodiments, several tens nanoseconds to several microseconds before a high-voltage pulse is applied from the pulse power source 13 to generate the main discharge, a high-voltage pulse is applied to the preionization electrode 81 from the pulse power source 44 to generate the preionization by generating corona discharge between the preionization electrode 81 and the anode 7. Thus, there can be effected stable discharge under a high gas pressure and a high current density.

In this case, though the holes 7a are formed in the anode 7, it is possible to use the anode 7 formed in a mesh state instead.

Figure 14:
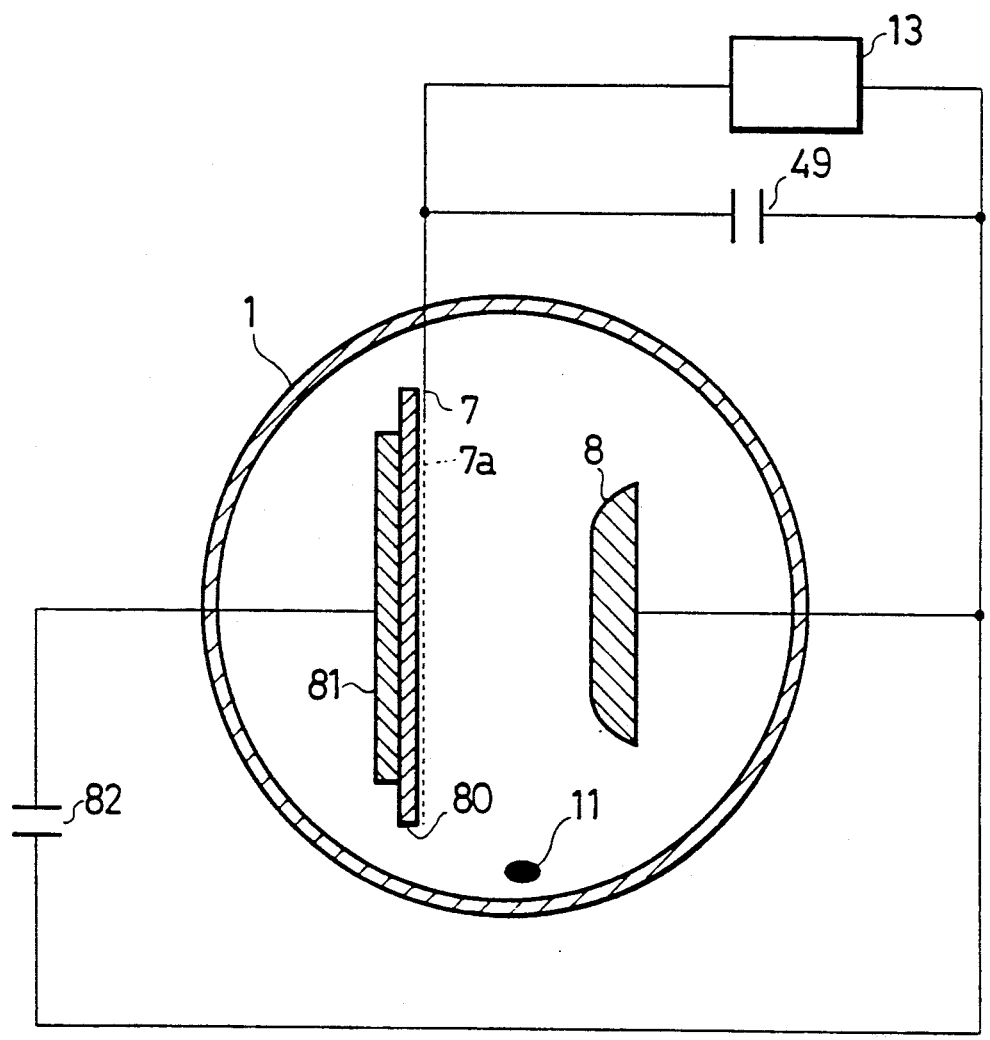

FIG. 14 is a schematic cross section to show an important part of still another modified example of a metal-vapor laser apparatus related to the second embodiment.

In the modified example, a preionization electrode 81 is connected through a capacitor 82 to the pulse power source 13 for applying a high-voltage pulse between the anode 7 and the cathode 8 so as to use the pulse power source 13 for a pulse power source of the preionization electrode 81 in common without separately providing another specific electric power source therefor. Thus, the pulse power source 13 effects the preionization by applying a high-voltage pulse to the preionization electrode 81 as well as generating the discharge between the anode 7 and the cathode 8. In this case, owing to the difference of circuit impedance and of peak value of current between the main discharge and the preionization, the preionization current reaches the peak value earlier than the other to effect the preionization. The other constructions are similar to those described in the foregoing modified example.

Accordingly, also in the modified example as similar to the above description, owing to the preionization generated by applying a high-voltage pulse from the pulse power source 13 to the preionization electrode 81, there can be effected stable discharge under a high gas pressure and a high current density.

Moreover, though several lumps of metal are placed in the discharge tube 1 in the second embodiment, it is possible to use a suitable metal chloride to effect low-temperature operation. Also in this case, owing to the preionization by preionization electrodes 40, 81 as described in the second embodiment, the stability of discharge between the anode 7 and the cathode 8 can be maintained, thus there can be obtained laser oscillation with high efficiency and high stability under low-temperature operation.

While, in the second embodiment, though the preionization electrodes 40, 81 are provided on the side of the anode 7, it is possible to provide them on the side of the cathode 8 or on both of these sides.

While, in the second embodiment, though the preionization is generated by the corona discharge by the preionization electrode 40, 81, it is possible to use ultraviolet rays generated by an arc gap, a plasma cathode and the like instead, X-ray generated by X-ray source.

Moreover, in the second embodiment, though the Joule heating caused by discharge is used as heating means for heating the lumps of metal, the heating means may be a suitable heater or means utilizing both the Joule heating by discharge and a heater. Moreover, it is possible to employ a method of generating a metal vapor by ion-sputtering.

In summary, according to the seconds embodiment, owing to the preionization generated by the preionization electrode provided on at least one side of the anode and the cathode, the main discharge between the anode and the cathode can be stabilized, thus there can be effected laser oscillation with high efficiency and high output.

Various modifications will become possible for those skilled in the art after receiving the teachings of the present disclosure without departing from the scope thereof.

What is claimed is:

1. A laser apparatus which creates a laser oscillation by exciting a laser medium by generating discharge between an anode and a cathode opposedly arranged to each other in a first tube, comprising:
    means for movably supported the anode and the cathode wherein the anode and cathode can move within and independent from the first tube and along the axial direction of the first tube.

2. A laser apparatus which creates a laser oscillation by exciting a laser medium by generating discharge between an anode and a cathode opposedly arranged to each other, comprising:
    (a) a discharge tube for containing the anode and the cathode; and
    (b) at least one second tube disposed in the discharge tube, said second tube being capable of moving independently of the discharge tube and along the axial direction of the discharge tube,
    wherein the anode and the cathode are supported in the second tube.

3. The laser apparatus according to claim 2, wherein the axial direction of the second tubes is substantially the same as that of the discharge tube.

4. The laser apparatus according to claim 2, wherein the discharge tube has holes at the circumferential face thereof into which conductive members for introducing current are inserted, and wherein at least one conductive member is connected to the anode and at least one conductive member is connected to the cathode, and said holes being larger than the conductive members.

5. The laster apparatus according to claim 4, wherein the holes of the discharge tube have such a size that the conductive members are not in contact with the discharge tube even when the anode, the cathode, and the discharge tube are expanded by heat generated during laser oscillation and when the second tube is moved along the axial direction of the discharge tube.

6. The laser apparatus according to claim 2, wherein the laser medium in the discharge tube is one of vaporized metal atoms and metal ions.

7. The laser apparatus according to claim 2, further comprising:
    a preionization electrode which is disposed near the surface of at least one of the anode and the cathode.

8. The laser apparatus according to claim 7, wherein the preionization electrode is an electrode for generating corona discharge.

9. The laser apparatus according to claim 8, wherein the preionization electrode further comprises at least one dielectric tube provided on at least one of the surface of the anode and the cathode and
    a third electrode consisting of a conductive rod inserted in the dielectric tube, wherein the corona discharge is generated by applying a pulse voltage between the preionization electrode and at least one of the anode and the cathode.

10. A metal-vapor laser apparatus of a transverse exciting type which creates a laser oscillation by exciting a laser medium by generating discharge between an anode and a cathode arranged oppositely to each other and vertically to the optical axis in a discharge tube, comprising:
    a preionization electrode which is disposed near a surface of at least one of the anode and cathode, wherein the preionization electrode is an electrode for generating corona discharge, and
    wherein at least one of the anode and cathode comprise a metal plate in which a plurality of holes are formed, and the preionization electrode comprises a third electrode consisting of a conductive rod provided at the back of the metal plate together with a dielectric interposed therebetween so that the corona discharge is generated by applying a pulse voltage between the third electrode and the metal plate.

11. A laser apparatus comprising:
    discharging tube;
    a pair of electrodes disposed in said discharging tube with a predetermined distance therebetween;
    an electric power supply for applying a high voltage between said electrodes;
    a vacuum system for evacuating the inside of said tube, wherein said vacuum system makes it possible for an electric discharge to take place between said electrodes by the application of said high voltage to said electrode; and
    a laser resonating medium disposed in said tube,
    wherein said electrodes can move independent from the discharging tube and in the axial direction of the discharging tube.

12. The apparatus of claim 11, wherein said electrodes are fixed to a second tube which is coaxially disposed in said discharge tube, said second tube being movable independent from the discharging tube and in the axial direction of the discharging tube.

13. A laser apparatus which creates a laser oscillation by exciting a laser medium by generating discharge between an anode and a cathode opposedly arranged to each other, comprising:
    (a) a discharge tube for containing the anode and the cathode; and
    (b) at least one second tube disposed in the discharge tube, said second tube being capable of moving independent of the discharge tube and along the axial direction of the discharge tube,
    wherein the anode and the cathode are supported in the second tube;
    wherein the discharge tube has holes at the circumferential face thereof into which conductive members for introducing current are inserted, and at least one conductive member is connected to the anode and at least one conductive member is connected to the cathode, and said holes being larger than the conductive members;
    wherein the conductive members are respectively connected to one end of flexible and thin current introducing plates respectively, the other end being connected to a power source at the outside of the discharge tube.

14. A laser apparatus which creates a laser oscillation by exciting a laser medium by generating discharge between an anode and a cathode opposedly arranged to each other, comprising:
(a) a discharge tube for containing the anode and the cathode;
(b) at least one second tube disposed in the discharge tube, said second tube being capable of moving independent of the discharge tube and along the axial direction of the discharge tube, and
(c) a preionization electrode which is disposed near the surface of at least one of the anode and the cathode;
wherein the anode and the cathode are supported in the second tube;
wherein the preionization electrode is an electrode for generating corona discharge;
wherein at least one of the anode and the cathode comprise a metal plate in which a plurality of holes are formed, and the preionization electrode comprises a third electrode consisting of a conductive rod provided at the back of the metal plate together with a dielectric interposed therebetween so that the corona discharge is generated by applying a pulse voltage between the third electrode and the metal plate.

* * * * *